United States Patent [19]
Chandley

[11] Patent Number: 5,298,974
[45] Date of Patent: Mar. 29, 1994

[54] APPARATUS FOR DETERMINING THE SURFACE TOPOGRAPHY OF AN ARTICLE

[75] Inventor: Paul J. Chandley, Southport, United Kingdom

[73] Assignee: Pilkington plc, United Kingdom

[21] Appl. No.: 778,275

[22] Filed: Oct. 17, 1991

[30] Foreign Application Priority Data

Oct. 17, 1990 [GB] United Kingdom ............... 9022477

[51] Int. Cl.$^5$ .................. G01B 11/30; G01N 21/00
[52] U.S. Cl. .................................. 356/371; 356/448; 356/239; 250/571; 250/572
[58] Field of Search ............ 356/371, 237, 239, 240, 356/445–448, 429–430; 250/571, 572, 562, 563

[56] References Cited

U.S. PATENT DOCUMENTS

| | | | |
|---|---|---|---|
| 3,748,048 | 7/1973 | Upatnieks et al. | 356/448 |
| 3,857,637 | 12/1974 | Obenreder | 356/371 |
| 4,158,507 | 6/1979 | Himmel | 356/371 |
| 4,929,846 | 5/1990 | Mansour | 356/371 |
| 4,937,764 | 6/1990 | Komatsu | 356/446 |
| 5,122,672 | 6/1992 | Mansour | 356/448 |

FOREIGN PATENT DOCUMENTS

| | | |
|---|---|---|
| 0893365 | 9/1982 | Belgium . |
| 0108497 | 5/1984 | European Pat. Off. . |
| 0069610 | 3/1990 | Japan .................... 356/371 |
| 1580196 | 11/1980 | United Kingdom . |
| 2073878 | 10/1981 | United Kingdom . |
| 2117898 | 10/1983 | United Kingdom . |

OTHER PUBLICATIONS

Research Disclosure, "Device for Evaluating Film Flatness"; Ghassan N. Kahwati; Oct. 1980 p. 409.
Chap. 11-3, pp. 422–423, *Laser Processing Theory*, Central Book Publishing Co. (Taiwan).
Pp. 136–137, *Optical Shop Testing*, ed. Daniel Malacara (New York).
English Abstract of Japanese Reference 57-35704; Feb. 1982.

*Primary Examiner*—Richard A. Rosenberger
*Assistant Examiner*—Hoa Q. Pham
*Attorney, Agent, or Firm*—Howrey & Simon

[57] ABSTRACT

An apparatus for determining the surface characteristics of a flat transparent article which includes a light beam source, a scanner to deflect the light beam to produce a line scan, a lens to collimate the light beam of the line scan, a locator for the flat transparent article to enable the article to be exposed to the collimated light, a grating through which the portion of collimated light reflected by the surface of the located article passes, another lens to focus the collimated light passing through the grating onto a sample detector which generates an intensity indicative signal, and a base reference signal generator. The signals are processed by a microprocessor to indicate the surface characteristics.

17 Claims, 2 Drawing Sheets

APPARATUS FOR DETERMINING THE SURFACE TOPOGRAPHY OF AN ARTICLE

BACKGROUND TO THE INVENTION

This invention relates to apparatus for determining the surface characteristics (surface topography) of an article, and, in particular, apparatus for determining the surface topography of a substantially flat article by means of a concentrated light beam.

At present there are several forms of apparatus suitable for determining the surface characteristics of an article. One of the most commonly utilised of these involves the use of a stylus which is drawn across the surface of the article at a constant speed. This apparatus is very sensitive, and because of the physical way in which it operates is very susceptible to wear induced inaccuracy. This necessarily implies that there is a relatively large amount of maintenance involved with the use of this type of apparatus.

It should also be noted that the following problems are also encountered in the use of a stylus to determine the surface characteristics:

In order to achieve an accurate determination it is essential that the surface of the article under test is level. Therefore, a large amount of time and effort can be involved in setting up the equipment and article under test;

In order to ensure uniformity within the results, due to the fact that stylus machinery provides an absolute measuring device, it is important that the device be operated at a fixed temperature;

In order to obtain usable results the stylus has to be drawn across the surface of the article at a very slow speed. In fact the stylus could take 30 seconds to traverse 100 mm of the surface of the article under test; and The stylus equipment is very prone to inaccuracy, because of its highly sensitive nature, caused by dirt particles and scratches in the surface of the article. This means that in order to minimise these errors the equipment and articles under test have to be cleaned thoroughly on a regular basis, or, alternatively, the apparatus operated in an expensively created dirt free environment.

SUMMARY OF THE INVENTION

The present invention is concerned with providing a form of apparatus in which these problems are eliminated or at least drastically reduced.

In accordance with the present invention, apparatus for determining the surface characteristics of a substantially flat article comprises:
a concentrated light beam source;
scanning means to deflect the light beam from the source so as to produce a line scan with the beam;
a first lens means to collimate the light beam of the line scan;
locating means to locate the substantially flat article in relation to exposure means provided on the locating means and to enable a section of the surface of the article to be exposed to the collimated light beam;
a grating of constant spacing through which the portion of the collimated light beam reflected by the surface of the article on the locating means is caused to pass;
a second lens means to focus the collimated light beam passing through the grating onto a sample detector means which generates a signal indicative of the intensity of the light hitting it; and
means to generate a base reference signal; wherein the signal from the sample detector means and the base reference signal are processed, which processing may include filtering, by a microprocessor to provide an indication of the surface characteristics of the article.

It will be well appreciated by those skilled in the art that as a result of the fact that the present invention relies on the light reflected by a particular surface of the article to enable the surface characteristics of that surface to be determined, in circumstances where the material of the article is transparent with respect to the light being used, if the light reflected by another surface was allowed to interfere with the desired reflected light signal significant problems would occur.

Therefore, in accordance with a second aspect of the present invention apparatus for determining the surface characteristics of a substantially flat transparent article comprises:
a concentrated light beam source;
scanning means to deflect the light beam from the source so as to produce a line scan with the beam;
a first lens means to collimate the light beam of the line scan;
locating means to locate the substantially flat transparent article in relation to exposure means provided on the locating means and to enable a section of the surface of the article to be exposed to the collimated light beam;
a grating of constant spacing through which the portion of the collimated light beam reflected by the surface of the article on the locating means is caused to pass;
a second lens means to focus the collimated light beam passing through the grating onto a sample detector means which generates a signal indicative of the intensity of light hitting it; and
means to generate a base reference signal;
wherein the exposure means is dimensioned so that for articles above a given thickness it will not allow light reflected after passage through the material of the article to pass back through the exposure means, and the signal from the sample detector means and the base reference signal are processed, which may include being filtered, by a microprocessor to provide an indication of the surface characteristics of the article.

In circumstances where the article is not transparent with respect to the light the dimensioning of the exposure means is not thereby limited.

In a preferred embodiment of the present invention, the exposure means comprises a slit provided in a flat plate.

Preferably, the means to generate a base reference signal comprises a block positioned between the first lens means and the locating means, and against which the collimated light beam is impinged to provide a reflected reference light beam in addition to the collimated light beam, which reflected reference light beam is passed through an identical grating to the collimated light beam reflected by the surface of the article, and is then passed through a lens means to focus it onto a reference detector.

In a preferred embodiment of the present invention the block is positioned at an angle so as to direct the reflected reference beam towards the grating and second lens means through which the light beam reflected by the surface of the article passes. Most preferably, the points at which the reflected reference light beam of the line scan and the reflected light beam of the line scan of the surface of the article under test hit the grating are substantially coincident.

With this particular arrangement for generating the base reference signal it will be appreciated by those skilled in the art that the block is manufactured from a material which is transparent with respect to the light beam.

The concentrated light beam source used with the present invention may be any means which produces a concentrated beam of light, such as gas lasers, solid state laser diodes, UV lasers etc.

In one embodiment of the present invention, the scanning means comprises a mirror which is rotated under the influence of an electrical drive means, this may, for example, be a galvanometer scanner or a polygonal scanner.

The present invention also includes a method of determining the surface characteristics of a substantially flat article, which method includes:
generating a concentrated light beam and directing this against a scanning means so that the beam is caused to mark out a cyclically repeatable linear scan;
collimating the light beam;
impinging the collimated light beam against the surface of the substantially flat article so that the collimated light beam is divided into a reflected portion and a portion which passes into the article;
passing the reflected portion of the light beam through a grating, and then a lens means to focus the light passing through the grating onto a light detector which emits an electrical signal indicative of the intensity of light hitting the light detector;
generating a base reference signal;
processing the electrical signal and the base reference signal, including filtering out unwanted signals, in a microprocessor to generate an indication of the surface characteristics of the surface.

In a preferred method in accordance with the present invention, the base reference signal is generated by means of a block of transparent material placed in the path of the collimated light beam at a position before the collimated light beam impinges the surface of the article under test, and angled so as to reflect a portion of the collimated light beam through a grating identical to that through which the light signal reflected by the surface of the article under test passes, and a lens means to focus the signal onto a light detector (reference) which emits an electrical signal indicative of the intensity of light hitting the light detector.

The combination of the grating and the lens means to focus the light signal onto a respective light detector means that the electrical signal emitted by the respective light detector has a sinusoidal waveform.

Now the surface of the block which is used to generate the base reference signal is created with as flat a surface as is possible. This is done to ensure that the sinusoidal waveform is of regular pitch or constant phase.

Now the surface of the article under test will have a number of peaks and troughs and the slopes associated with these will cause the angle at which the collimated light beam is reflected to vary in accordance with the angle of the slope and its direction. In turn this will cause the light signal passed to the light detector (sample) to have a sinusoidal waveform with varying pitch/phase of intensity.

In a preferred embodiment of the present invention the signals are processed by the microprocessor in a manner which comprises utilising the variation in the pitch/phase of the sample signal with respect to the reference signal to determine the surface characteristics.

BRIEF DESCRIPTION OF THE DRAWINGS

The invention will now be illustrated, by way of description of a preferred embodiment of the present invention, with reference to the accompanying drawings, in which.

DETAILED DESCRIPTION OF THE PREFERRED EMBODIMENTS

Figure 1:
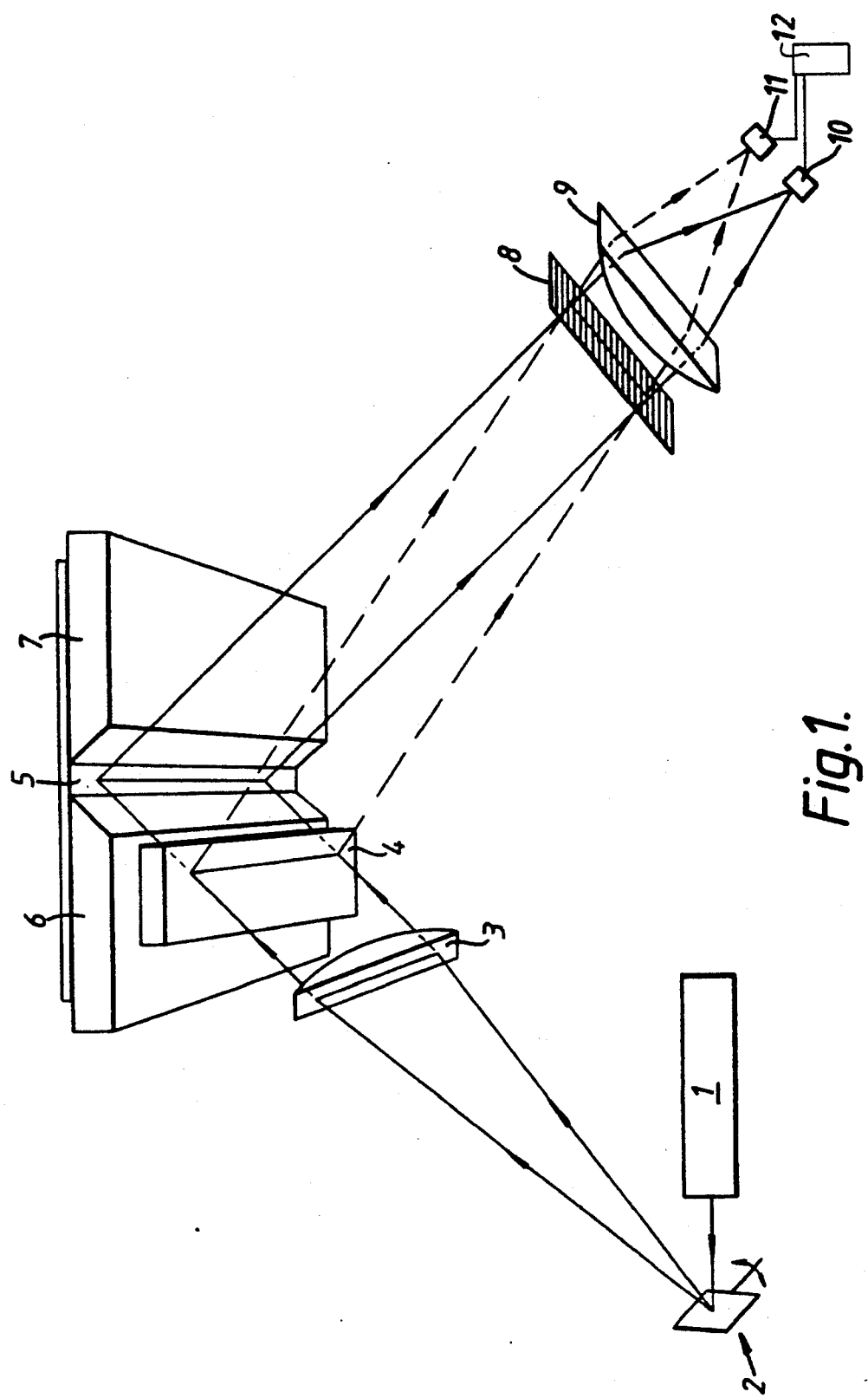
FIG. 1 shows a schematic representation of the apparatus of the present invention; and, FIG. 2 shows a schematic representation of the slit of the apparatus as shown in FIG. 1.

Now referring to FIG. 1 of the drawings, in broad outline the apparatus made in accordance with the present invention comprises:
a concentrated light source 1;
scanning means 2;
a first lens means 3;
a flat block 4 which enables a reference signal to be generated;
locating means comprising two plates 6 and 7 which define a slit 5 the slit 5 comprising an exposure means;
a grating 8;
a second lens means 9; and
a light detector (sample) 10 and a light detector (reference) 11.

The concentrated light source 1 in this particular embodiment comprises a laser, for example, a gas laser such as a Helium Neon laser emitting a light beam of light having a wavelength at $0.6328 \times 10^{-6}$ m.

The scanning means 2 comprises a mirror which is caused to rotate in a particular direction, from a start position, through a predetermined angular displacement at a constant rate before being allowed to return to the start position. In this particular example the above described cycle is repeated at a frequency of 50 Hz, and a plot of angular displacement and time would produce a sawtooth type profile.

The rotation of the mirror of the scanning means through the predetermined angular displacement causes the concentrated light beam from the laser to define a line so producing a line scan. In this particular example, because the mirror rotates through a fixed angle the actual length of the line scan defined is dependent upon the distance between the scanning means and the first lens means 3. The greater this distance the greater the length of the line scan, and the faster the speed of the light beam across the line scan for a particular scanner speed.

The first lens means 3 is positioned between the slit 5 and the scanning means 2 so that the scanning means 2 is at the focal point of the first lens means 3 and acts so that a light source directed through the first lens means 3 and scanned by the scanning means 2 defines a line scan, which line scan is collimated.

The flat block 4 is positioned between the slit 5 and the first lens means 3, and is manufactured with the surface thereof closest to the scanning means 2, and therefore the surface against which the scanning means 2 directs the concentrated light source 1, having as close to a perfectly flat surface as is possible.

Further the flat block 4 is positioned and angled so that a portion (approximately 10%) of the concentrated light source signal directed thereagainst is reflected so as to produce a reference signal whilst a majority of the concentrated light source signal is allowed to pass through the block. Consequentially, this block 4 is manufactured from a material which is transparent to the concentrated light source signal.

The slit 5 in the locating means has, in use, placed thereover, a substantially flat article so that a section of the surface thereof in contact with the plates 6 and 7 is exposed to the directed line scan passing through the block 4.

In the vicinity of the slit 5 the plates 6 and 7 are provided with angled sides. The actual angle of these sides is dependant upon the angle at which the concentrated light beam impinges upon the surface of the article. However, it is selected so as to minimise the amount of stray light reflected by the plates which could interfere with the light reflected by the article. It has been found that an angling 5° shallower than the angle of impingement of the concentrated light beam on the article provides adequate results in this area.

One of the uses envisaged for the apparatus of the present invention is in the determination of the suitability of glass sheet material in liquid crystal displays where undue local waviness may cause the display to be cosmetically unsuitable.

As will be well appreciated by those in the industry the wavelength of the light being used means that with respect to this the glass sheet material is transparent. Therefore, as only a portion of the concentrated light beam will be specularly reflected by the surface of the object in contact with the locating means in the location of the slit 5, a significant portion of the concentrated light beam will be transmitted through the article and a portion of this will be reflected by the other surface of the object producing a second reflected component and thereon. If this second reflected component is allowed to interfere with light reflected by the surface of the article in contact with the locating means a meaningless signal into the sample detector will be produced.

Figure 2:
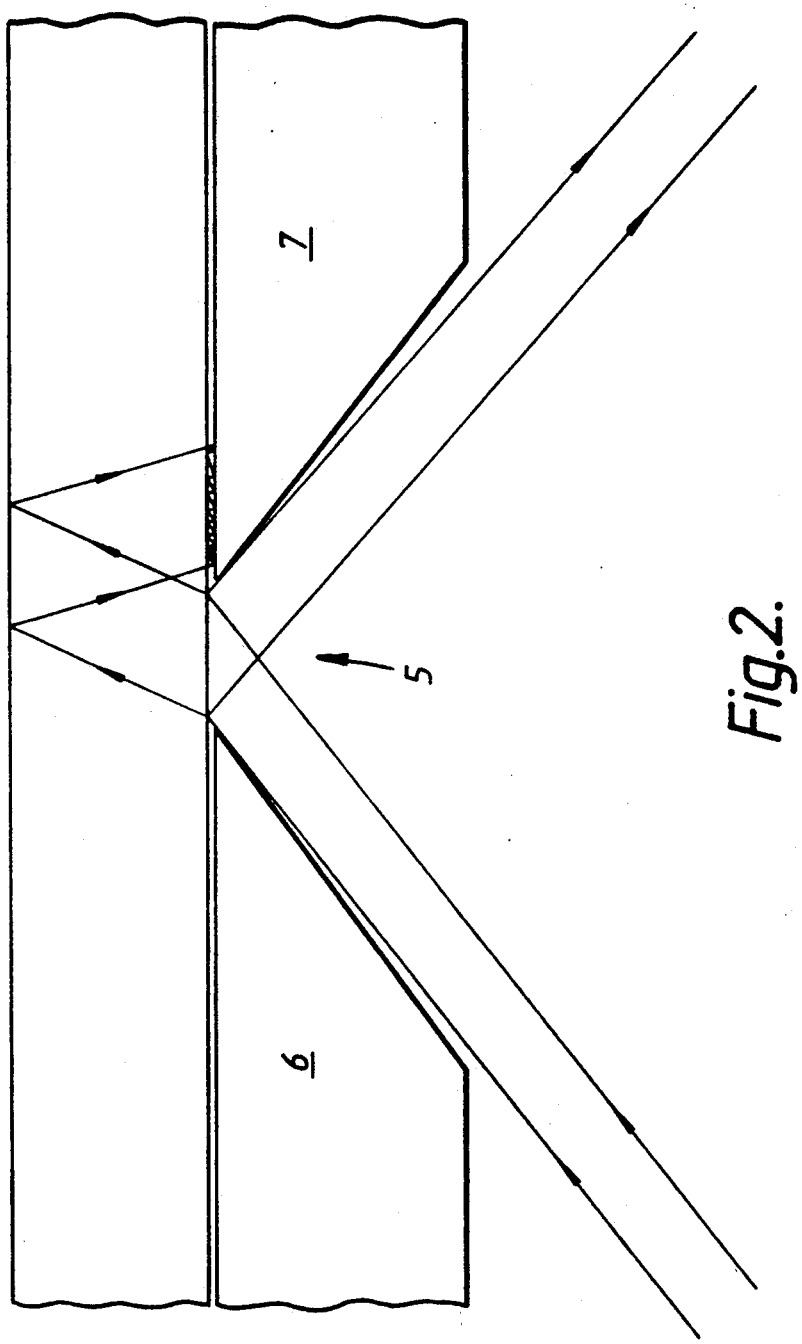

Therefore, in circumstances where the material of the article in question is transparent to the particular wavelength of light being used it is important that the slit is of a width sufficiently narrow that for the minimum thickness of material to be used on the apparatus the slit will prevent the second and higher order reflected components from passing through the slit towards the grating 8. This is illustrated in FIG. 2 of the accompanying drawings.

In an alternative arrangement, the concentrated beam may emit a wavelength of light which if it passes into the body of the article is completely absorbed by the material of the body, meaning that the only parts of the light beam remaining are those parts specularly reflected by the flat block 4 and that are specularly reflected by the surface of the article in contact with the locating means 5. In this case it will be appreciated that the width of the slit is of no physical consequence to the operation of the apparatus. An example of this arrangement would be an ultra violet emitting laser when used in conjunction with glass. However it must be stressed that the flat block 4, in this described type of arrangement, must always be made from a material which is transparent with respect to the wavelength of light being emitted by the laser.

The grating 8 comprises a transparent substrate onto which is formed at a pitch of 1 mm, ½ mm wide stripes of chromium metal. The grating 8 is positioned so that the light reflected by the surface of the article placed over the slit 5, and the light reflected by the block 4 pass through the grating at substantially the same position. Now as the light reflected by the article and the light reflected by the block 4 pass through the grating 8 at differing angles there is no problem with the reflected light signals interfering with one another.

The light reflected by the block 4 and the surface of the article within a cycle of the scanning means 2 define a respective line which impinges onto the grating 8 in a line transverse to the strips of chromium formed on the grating 8.

The second lens means 9 is positioned immediately behind the grating 8 and directs the light passing through the grating 8 to a respective detector 10 or 11 positioned therebehind.

In the case of the light reflected by the surface of the article the second lens means focuses the light into a point source and onto the light detector (sample) 10, and in the case of the light reflected by the surface of the block 4 focuses into a point source and onto the light detector (reference) 11.

The light detectors 10 and 11 generate respective electrical signals which are indicative of the intensity of light detected by the detectors. These electrical signals are passed to a microprocessor 12 where they are processed to give an indication of the surface characteristics of the article. The electrical signals may be processed by the microprocessor 12 so as to filter out unwanted long pitch characteristics on the surface of the article under test.

It should be noted that in unison the grating 8 and the second lens means 9 act on the sample signal and the reference signal so that the intensity of the light focused onto the respective light detector 10 or 11 varies in a sinusoidal waveform.

The sinusoidal waveform produced by the reference light signal if the surface of the block 4 was perfectly flat would have a regular pitch or constant phase. However, as the block 4 is produced with as near as perfectly flat surface as is possible it will be very near to having a regular pitch.

Now, because the surface of the article under test will have a series of peaks and troughs the sinusoidal waveform of the sample signal will not be of a regular pitch or constant phase. This is due to the fact that the light beam will be reflected at slightly differing angles by the slopes of these peaks and troughs. In turn this will vary the position, with respect to the expected position for a perfectly flat surface, of the light beam impinging the grating.

The reference light signal and the sample signal are processed by the microprocessor in a way which utilises this phase shift to provide detail concerning the surface characteristics of the article.

In use the laser fires a beam of high energy concentrated light against the mirror of the scanning means 2.

As mentioned in the above description the mirror of the scanning means 2 goes through the following cycle at a rate of 50 Hz:
rotation at a constant speed from a starting position through a predetermined angular displacement; and
rapid travel back to the starting position.

The mirror deflects the high energy concentrated light beam through an angle which is dictated by the actual position of the mirror relative to the beam. Therefore as the actual position of the mirror relative to the beam varies the beam is deflected in such a way so as to produce a line scan.

The beam of high energy concentrated light then passes through the first lens means 3 where it is collimated and then impinges against the flat block 4 where it is divided into two components. The first of these components comprises approximately 10% of the original signal and is reflected from the surface of the block 4 against which the light was caused to impinge, this is the reference signal.

The second component comprises a majority of light in the beam and this passes through the block 4 and then through the slit 5 where it impinges the surface of an article placed over the slit 5, such as a glass article.

In this particular example, the article is transparent with respect to the beam, therefore the impingement causes the beam to be split into two further components. A first reflected component which passes onto the grating 8 and a second component which passes through the article. The second component then impinges the other surface of the article and a portion of this is reflected back into the article. As was mentioned above the slit 5 is dimensioned so that none of the reflected portion of the second component may re-enter through the slit 5 and interfere with the first reflected component of the beam impinging the surface of the article.

Both the reference signal and the first reflected component (sample signal) are caused to impinge the grating 8 at approximately the same position on the grating 8. As mentioned in the above description as the reference signal and sample signal enter the grating 8 at differing angles there is no problem with reflected light signals interfering with one another.

The sample signal and reference signal are now passed through the second lens mean 9 which focuses the signals onto a light detector (sample) 10 and light detector (reference) 11 respectively.

In turn, the light detectors each generate an electrical signal indicative of the intensity of light acting thereon. These electrical signals are now passed onto the microprocessor where they are processed, including any filtering to remove unwanted long pitched trends to give an indication of the localised surface characteristics of the article under test.

What I claim is:

1. Apparatus for determining the surface characteristics of a substantially flat article, comprising:
   a concentrated light beam source;
   scanning means to deflect the light beam from the source so as to produce a line scan with the beam;
   a first lens means to collimate the light beam of the line scan;
   locating means which defines exposure means, the locating means being arranged to locate the substantially flat article in relation to the exposure means and to enable a section of the surface of the article to be exposed to the collimated light beam through the exposure means;
   a grating of constant spacing through which the portion of the collimated light beam specularly reflected by the exposed surface of the article on the locating means is caused to pass;
   a second lens means disposed down stream of said grating to focus the collimated light beam passing through the grating onto a sample detector means which generates a signal indicative of the intensity of the light hitting the sample detector means; and
   means to generate a base reference signal, wherein the signal from the sample detector means and the base reference signal are processed by a microprocessor to provide an indication of the surface characteristics of the article.

2. Apparatus as claimed in claim 1, wherein the exposure means comprises a slit provided in a flat plate of the locating means.

3. Apparatus as claimed in claim 1, wherein the means to generate a base reference signal comprises a block positioned between the first lens means and the locating means, and against which the collimated light beam is impinged to provide a reflected reference light beam in addition to the collimated light beam, which reflected reference light beam is passed through an identical grating to the collimated light beam reflected by the surface of the article, and is then passed through a lens means to focus the reflected reference light beam onto a reference detector.

4. Apparatus as claimed in claim 3, wherein the block is positioned at an angle so as to direct the reflected reference beam towards the grating and second lens means through which the light beam reflected by the surface of the article passes.

5. Apparatus as claimed in claim 3, wherein the reflected reference light of the line scan and the reflected light beam of the line scan of the surface of the article under test hit the grating at substantially coincident points on the grating.

6. Apparatus as claimed in claim 1, wherein the scanning means comprises a rotatable mirror.

7. Apparatus according to claim 1 wherein the microprocessor which processes the signal from the sample detection means and the base reference signal includes filtering.

8. Apparatus for determining the surface characteristics of a substantially flat transparent article, comprising:
   a concentrated light beam source;
   scanning means to deflect the light beam from the source so as to produce a line scan with the beam;
   a first lens means to collimate the light beam of the line scan;
   locating means which defines exposure means, the locating means being arranged to locate the substantially flat transparent article in relation to the exposure means and to enable a section of the surface of the article to be exposed to the collimated light beam through the exposure means;
   a grating of constant spacing through which the portion of the collimated light beam specularly reflected by the exposed surface of the article on the locating means is caused to pass;
   a second lens means disposed down stream of said grating to focus the collimated light beam passing through the grating onto a sample detector means which generates a signal indicative of the intensity of light hitting the sample detector means; and
   means to generate a base reference signal, wherein the exposure means is dimensioned so that for articles above a given thickness the exposure means will not allow light reflected after passage through the material of the article to pass back through the exposure means, and the signal from the sample detector means and the base reference signal are processed by a microprocessor to provide an indication of the surface characteristics of the article.

9. Apparatus as claimed in claim 8, wherein the exposure means comprises a slit provided in a flat plate of the locating means.

10. Apparatus as claimed in claim 8, wherein the means to generate a base reference signal comprises a block positioned between the first lens means and the locating means, and against which the collimated light beam is impinged to provide a reflected reference light beam in addition to the collimated light beam, which reflected reference light beam is passed through an identical grating to the collimated light beam reflected by the surface of the article, and is then passed through a lens means to focus the reflected reference light beam onto a reference detector.

11. Apparatus as claimed in claim 10, wherein the block is positioned at an angle so as to direct the reflected reference beam towards the grating and second lens means through which the light beam reflected by the surface of the article passes.

12. Apparatus as claimed in claim 10, wherein the reflected reference light of the line scan and the reflected light beam of the line scan of the surface of the article under test hit the grating at substantially coincident points on the grating.

13. Apparatus as claimed in claim 8, wherein the scanning means comprises a rotatable mirror.

14. Apparatus according to claim 8 wherein the microprocessor which processes the signal from the sample detection means and the base reference signal includes filtering.

15. A method of determining the surface characteristics of a substantially flat article, which method includes:
    generating a concentrated light beam and directing this against a scanning means so that the beam is caused to mark out a cyclically repeatable linear scan;
    collimating the light beam;
    impinging the collimated light beam against the surface of the substantially flat article so that the collimated light beam is divided into a reflected portion and a portion which passes into the article;
    passing the specularly reflected portion of the light beam through a grating, and then a lens means disposed down stream of said grating to focus the light passing through the grating onto a light detector which emits an electrical signal indicative of the intensity of light hitting the light detector;
    generating a base reference signal;
    processing the electrical signal and the base reference signal, including filtering out unwanted signals, in a microprocessor to generate an indication of the surface characteristics of the surface.

16. A method as claimed in claim 15, wherein the base reference signal is generated by means of a block of transparent material placed in the path of the collimated light beam at a position before the collimated light beam impinges the surface of the article under test, and angled so as to reflect a portion of the collimated light beam through a grating identical to that through which the light signal reflected by the surface of the article under test passes, and a lens means to focus the signal onto a light detector which emits an electrical signal indicative of the intensity of light hitting the light detector.

17. A method as claimed in claim 15, wherein the signals are processed by the microprocessor in a processing step which comprises utilising the variation in the pitch/phase of the sample signal with respect to the reference signal to determine the surface characteristics.

* * * * *